UNITED STATES PATENT OFFICE.

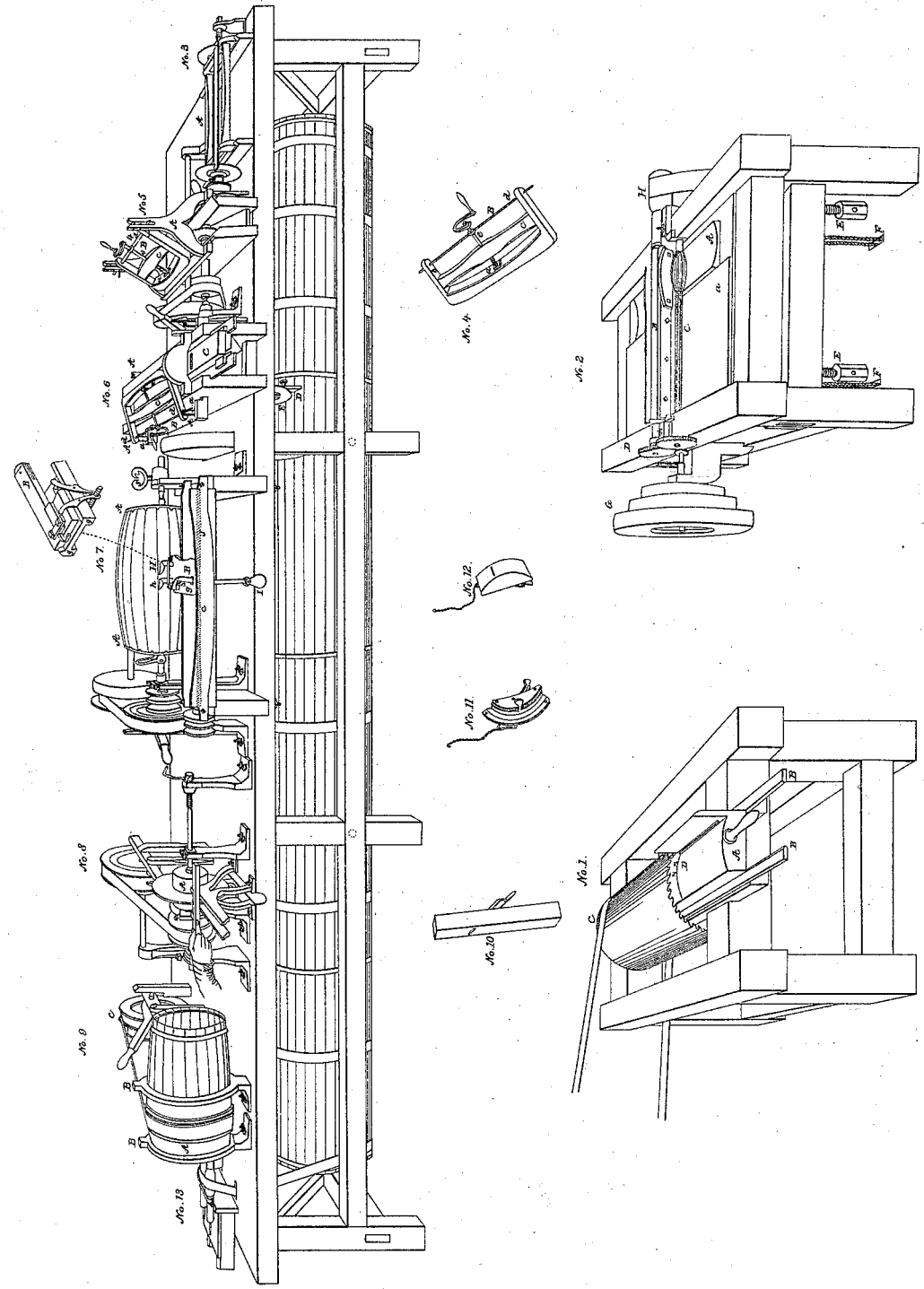

HORACE BAKER, OF McLEAN, NEW YORK.

MACHINERY FOR MAKING BARRELS.

Specification of Letters Patent No. 3,683, dated July 30, 1844.

*To all whom it may concern:*

Be it known that I, HORACE BAKER, of McLean, in the county of Tomkins and State of New York, have invented a new and useful Improvement in Machinery for Making Barrels, Firkins, &c.; and I do hereby declare that the following is a full, clear, and exact description thereof, reference being had to the accompanying drawings, which form a part of this specification, in which—

Figure 1 is the apparatus for sawing the staves from the bolt. It consists of a cylinder saw $c$ supported in a suitable frame, and having a sliding carriage A on which the bolt rests to be moved up to it on ways B.

Fig. 2 represents a machine for planing the staves after being sawed, to make them all of an equal thickness. It consists of a stout framework in which there is placed a horizontal platform ($a$) which contains an iron plate A, made on its face the segment of a hollow cylinder of the size of the saw. The platform and iron plate are elevated or depressed by means of set screws E running up through the frame underneath. At the center of the frame there is a revolving plane B, the irons of which are made convex, so as to cut the inside or concave side of the side of the stave smooth when put on to the iron plate A, the stave being carried under the plane by a ribbed roller C, and held down on the opposite side by a smooth roller D. On the same shaft as the convex knives are placed on are straight knives beside them; these are for planing the heading. The staves are then cut off the proper length by means of two circular saws on the same shaft, shown at Fig. 3, A being the carriage on which they are placed that carries them up to the saws.

Fig. 5 represents one of my most important improvements. It is for edging the staves and consists of an upright circular saw C, on each side of which are ways D, on which a carriage A slides horizontally. This carriage is formed of two side pieces that slide in grooves in the ways D, connected by two end pieces that are elevated into standards to support a swinging frame to which the staves are secured while sawing. This frame is more plainly represented in Fig. 4, in which ($a$) is the bed or bar on which the stave lays. It is just the curve the bilge of the cock requires. From each end of this bar extend up two radial arms ($b$) parallel with each other, and having a cross piece ($c$) run across from one to the other just above the bar ($a$), and at the exact distance of the radius of the circle of the cask required, from the face of bar ($a$), a shaft ($d$) is put through the arms, which extends beyond them at each end. Through the center of the cross piece ($c$) a screw ($e$) is put that serves to press the stave down to the proper shape for edging and jointing. On the lower end of this screw there is a plate interposed, between it and the stave. When the stave is thus prepared and brought into shape for edging. The ends of the shaft ($d$,) are put into the standards A, of Fig. 5 directly over the saw and rests in the slots in said standards at the proper height, which is governed by a pin passing through the slot for that purpose. In putting in the frame it is swung to one side, far enough to only cut off as much as is necessary from the edge of the stave to make a perfect joint, and it is run past the saw, and drawn back, and swung to the other side, and again run past, cutting both edges to the proper taper and bevel. The frame is then taken out and carried to the next apparatus, which is for jointing the edge of the stave. It consists of a reciprocating jointer C, Fig. 6, which is moved back and forth by any convenient machinery, on ways F, to which, on each side, are adjustable standards ($a$) which can move to or from the jointer. In these standards the shaft ($d$) of the frame B, is made to rest, on a level with the face of the jointer by which means the edge of the stave is placed on a radial line from the shaft, and jointed to the exact bevel required, for the size cask for which it is intended. It is then taken from the frame ready to be set up.

In setting up a barrel, I use iron trap hoops turned on the inside perfectly true and set up in the usual way, when the joints are all closed in, and the ends even, a shaft is put through its center, near one end of which, there is a cap or head A, Fig. 7, having spurs all around its edge, standing out from the face, that stick into the ends of the staves. Another movable cap A' is then put on and pressed on to the opposite end of the staves, being furnished with similar spurs. These hold the staves firmly in place, and the trip hoops are all taken off. The shaft is then put into the lathe as shown in Fig. 7, the mandrel is driven like those of common lathes. On one side, parallel with the shaft, a straight way is placed, on a level with the shaft, on which a carriage (g) slides back and forth, driven by a screw C shown by dotted lines in the Fig. 7. On this carriage (g) there are ways, at right angles to those first named and shown above in the drawing, on which are placed the carriage B that slides up to, or away from the barrel, guided by a curved bar T, which is parallel with the side of the barrel; this holds the chisels H, h, so that, as the carriage (g) progresses along the side of the barrel, the cutter carriage recedes till it reaches the bilge. When it passes that point it is pushed forward in the regular curve turning the outside of the article perfect; it will be obvious that the curved piece can be made of any shape to suit the work to be done; the carriage B is drawn back against it by a weight I, and forced up, by the curved piece.

The head is turned by a machine shown in Fig. 8 and the cask leveled howeled and crossed, in that represented Fig. 9.

Fig. 10 is a leveling plane; Fig. 11, a crossing plane; Fig. 12, a howeling and champing plane. Fig. 13 is for doweling the heads. These need no description as they are well known.

Having thus fully described my improvements, which I claim as my invention and desire to secure by Letters Patent is—

1. The employment of the swing frame (shown at Fig. 4,) constructed and arranged as above described in combination with the edging and jointing machine in the manner and for the purpose herein set forth.

2. I also claim the method of holding the staves for turning, in combination with, the movable, double motion cutter carriage, arranged and constructed as before specified.

HORACE BAKER.

Witnesses:
   J. J. GREENOUGH,
   W. THOMPSON.